Oct. 9, 1962
K. MILLER
3,057,158
TEMPERATURE RESPONSIVE THROTTLE FOR
COMBUSTION CHAMBER COOLING AIR
Filed Jan. 11, 1960
2 Sheets-Sheet 2
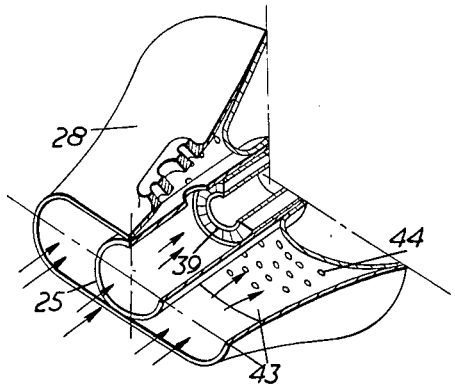
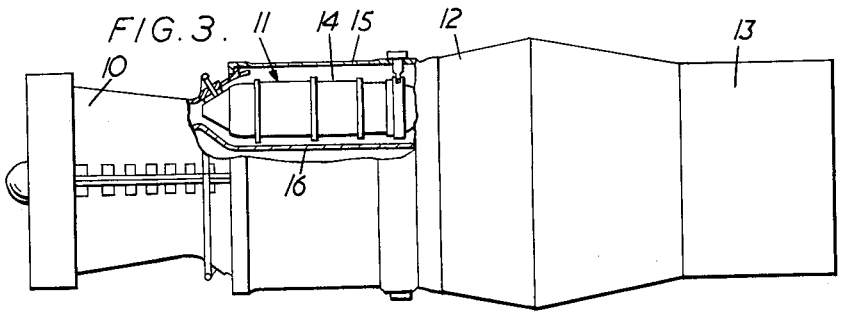
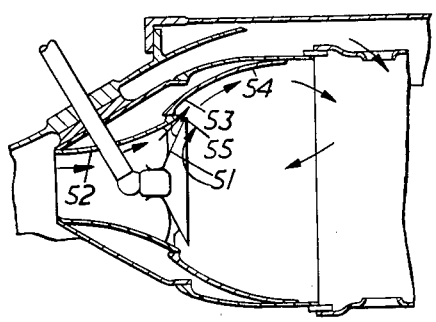
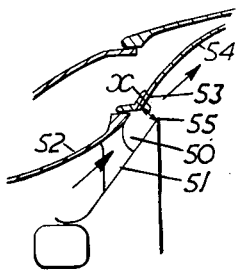
Kenneth Miller
Inventor
By
Fred L. Witherspoon, Jr. &
Fred E. Shoemaker  Attorneys United States Patent Office 3,057,158
Patented Oct. 9, 1962

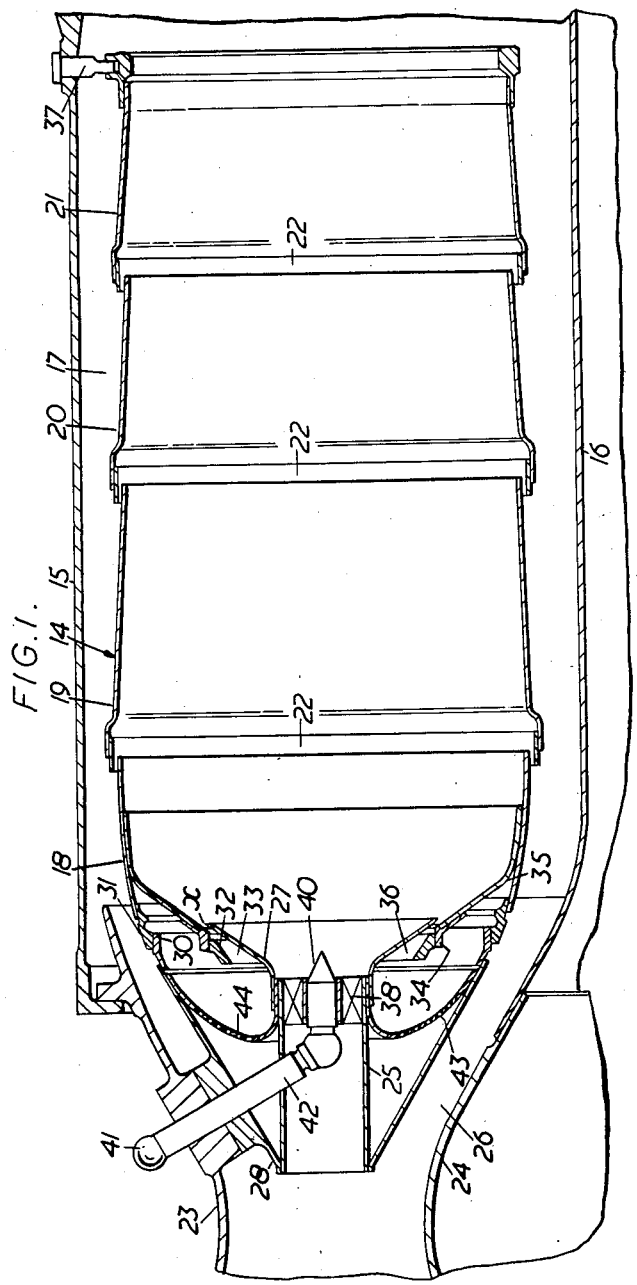

3,057,158
TEMPERATURE RESPONSIVE THROTTLE FOR COMBUSTION CHAMBER COOLING AIR
Kenneth Miller, Shelton Lock, Derby, England, assignor to Rolls-Royce Limited, Derby, England, a British company
Filed Jan. 11, 1960, Ser. No. 1,560
Claims priority, application Great Britain Jan. 29, 1959
9 Claims. (Cl. 60—39.66)

This invention concerns improvements in or relating to combustion chambers, and although it is not so restricted, is more particularly concerned with the combustion chambers of a gas-turbine, jet reaction engine for an aircraft.

The combustion chambers of such an engine commonly comprise flame tubes having primary zones whose internal walls are cooled by a supply of cooling air from the compressor of the engine. When the combustion chambers are operated at high temperatures (e.g. at take-off) considerable quantities of such cooling air are required. When, however, the aircraft is flying at high altitudes and at economy cruise speeds, the fuel consumption and hence temperature within the combustion chambers will be substantially lower than at take-off and, if the said considerable quantities of cooling air continue to be supplied, local chilling of the flame occurs with a consequent fall in combustion efficiency.

It is the object of the invention to overcome this disadvantage.

According, therefore, to the present invention a combustion chamber is provided with means for directing cooling air onto a wall of the chamber and control means for increasing or decreasing the supply of cooling air directed onto said wall upon increase or decrease respectively of the temperature of said wall.

Preferably the control means comprises a throttle which controls the supply of cooling air, one part of the throttle being constituted by or connected to said wall, the arrangement being such that, on thermal expansion and contraction of the wall, the said throttle part moves so as respectively to increase and decrease the air supply through said throttle.

Thus the combustion chamber may comprise an outer casing within which is mounted a flame tube, opposite ends of the flame tube being respectively fixed and movable with respect to said casing, the movable throttle part being constituted by or connected to the movable end of the flame tube and being spaced from a member which is fixed with respect to the casing, means being provided for supplying cooling air to the space between the movable throttle part and the said fixed member. Preferably the fixed member is mounted within the movable end of the flame tube so that the cooling air is directed onto the internal wall of the latter.

An annular clearance is preferably provided between the outer casing and the flame tube, means being provided for directing cooling air through said clearance so as to cool the external wall of the flame tube. The flame tube may be provided at axially spaced points with openings through which cooling air from said clearance may enter the flame tube so as to cool the internal wall thereof.

The fixed end of the flame tube may be connected to the outer casing by a pin joint, the movable end of the flame tube forming a sliding joint with means fast with the outer casing. The invention is illustrated, merely by way of example, in the accompanying drawings, in which:

FIGURE 1 is an axial section through a combustion chamber according to the invention, FIGURE 2 is a sectional perspective view of a part of the combustion chamber shown in FIGURE 1, FIGURE 3 is a diagrammatic representation of a gas-turbine, jet-reaction engine incorporating the combustion chamber shown in FIGURES 1 and 2, FIGURE 4 is a section through an alternative embodiment of the invention; and FIGURE 5 is an enlarged section of a portion of FIGURE 4.

Referring first to FIGURE 3, a gas-turbine jet-reaction engine of an aircraft comprises a compressor 10, combustion chambers 11 (only one shown), turbine 12 and jet pipe 13.

In FIGURES 1 and 2 there is shown in greater detail one of the combustion chambers 11, the said combustion chamber comprising a flame tube 14 which is mounted within a compartment whose walls are constituted by the engine casing 15 and a partition wall 16 mounted within the engine casing. Between the said walls and the flame tube 14 there is an axially extending annular clearance 17.

The flame tube 14 is formed of four axially consecutive portions 18–21, the rear ends of the portions 18–20 being mounted within the forward ends of the portions 19–21 respectively with the interposition therebetween of annular strip members 22. The members 22 have axially extending corrugations so that air flowing through the clearance 17 may pass between said corrugations and so into the flame tube.

The casing 15 and partition wall 16 have forward portions 23, 24 respectively within which is mounted a tube 25. An annular space 26, which communicates with the annular clearance 17, is provided between the tube 25 and the said forward portions 23, 24. About the rear end of the tube 25 there is secured an outwardly flared member 27.

The tube 25 is carried by struts 28 which are secured to the casing portion 23. At their rear ends the struts 28 support a ring 30 which is mounted within and bears against a ring 31 provided at the forward end of the flame tube portion 18.

A ring 32, which is carried by webs 33 extending from the flared member 27, is mounted within and bears against a ring 34. The ring 34 is provided at the forward end of a substantially frustoconical member 35 which is mounted within the flame tube portion 18. It will be noted that there is an annular space 36 between the flared member 27 and the rings 32, 34.

The rear end of the flame tube 14 is connected by a pin joint 37 to the casing 15 so as to be fixed with respect thereto. The rings 30, 31 and 32, 34, however, constitute sliding joints. Thus differential expansion or contraction between the casing 15 and flame tube 14 will cause relative sliding movement between the rings 31, 34 and the rings 30, 32 and hence alteration of the size of the annular space 36.

Mounted within the tube 25 is an annular diffuser 38 having axially extending passages 39 (FIGURE 2) which are so formed as to cause swirling of air passing therethrough and into the flame tube. Within the diffuser 38 there is mounted a spray nozzle 40 to which liquid fuel may be supplied from a manifold 41 by way of a pipe 42.

A curved sheet metal member 43, which is perforated with holes 44, extends between the rear ends of the tube 25 and struts 28.

In operation, and referring to FIGURE 1 which shows the position of the parts of the combustion chamber at take-off and at other high-temperature operating conditions, air will be forced by the compressor 10 into the tube 25 and into the space 26 and the annular clearance 17.

The air passing through the tube 25 passes into the primary zone of the combustion chamber, which primary zone is located within the flame tube portion 18, and supports combustion of the fuel injected into the combustion chamber from the nozzle 40.

The air flowing through the annular clearance 17 cools the external wall of the flame tube and some of this air will pass between the corrugations of the various strip members 22 so as to provide a film of cooling air adjacent the inner walls of the flame tube portions 19–21.

Some of the air passing through the space 26 will flow through the holes 44 and annular space 36 into the flame tube portion 18 so as to cool the internal wall thereof.

When, however, the aircraft is flying at high altitudes and at economy cruise speeds, so that the fuel supply to the combustion chamber, and hence its temperature, is reduced, contraction of the flame tube 14 will occur. The forward end of the flame tube will therefore move rearwardly so as to reduce the size of the annular space 36 and hence reduce the flow of cooling air therethrough. Excessive cooling of the internal wall of the portion 18 during high altitude flight at economy cruise speeds will therefore be avoided.

An alternative arrangement is shown in FIGURES 4 and 5, in which the diffuser 38 is eliminated, the primary air being introduced through an annular thermal control space 50 between a burner cone 51 and the flame tube casing 52.

The size of the annular space 50 will be adjusted as a result of movement of the upstream end 53 of flame tube section 54 with respect to the outer point 55 of the cone 51, such movement occurring on expansion and contraction of the flame tube as hereinabove described with reference to the previous figures.

The annular thermal control space 50 would not only control cooling, but would also tend to reduce the large variations of air/fuel ratio which might otherwise occur in the primary combustion zone.

In one practical embodiment of the present invention, the annular space 36 or 50 was such that the width $x$ of its downstream end was zero when the combustion chamber was cold. Under conditions, however, which exist at 40,000 feet above sea level, when the throttle is maintained at the minimum cruise setting, the width $x$ opened up to approximately 0.040" and combustion efficiency showed a marked improvement. At sea level, take-off, conditions the combustion chamber is much hotter and the gap would then be about 0.105" which is the usual standard gap.

I claim:

1. In a combustion chamber, a wall partially defining said chamber, combustion air inlet means, cooling air inlet means, directing means associated with said chamber and said cooling air inlet means for directing cooling air onto the internal surface of said wall of the chamber, said directing means and said wall together constituting throttle means constructed to control the supply of cooling air only, relative movement of the throttle means being automatically controlled solely by the thermal expansion and contraction of said wall.

2. A combustion chamber comprising a casing, a flame tube mounted within said casing, opposite ends of the flame tube being respectively fixed and movable with respect to said casing, combustion air inlet means at the upstream end of said flame tube, cooling air inlet means, means for directing cooling air onto an internal surface of the wall of the flame tube near the movable end of of said tube, said directing means and the movable end of said flame tube together forming throttle means which controls the supply of cooling air only, relative movement of said throttle means being automatically controlled solely by the thermal expansion and contraction of the wall of the flame tube.

3. A combustion chamber comprising a casing, a flame tube mounted within said casing with an annular clearance therebetween, opposite ends of the flame tube being respectively fixed and movable with respect to said casing, means for directing cooling air through said clearance so as to cool the external wall of the flame tube, means to conduct combustion air into said tube, directing means for directing cooling air only onto the internal surface of the wall of the flame tube, said directing means being fixed with respect to the casing and being mounted within but spaced from the movable end of the flame tube, said directing means and said flame tube together forming a throttle which controls the supply of cooling air only, the size of said throttle opening being automatically controlled solely by the thermal expansion and contraction of said flame tube wall.

4. A combustion chamber comprising a casing, a flame tube mounted within said casing, opposite ends of the flame tube being respectively fixed and movable with respect to said casing, means for directing cooling air onto an internal surface of the wall of the flame tube, a throttle which controls only the supply of cooling air, one part of the throttle being connected to the movable end of the flame tube so as to be movable therewith, and a throttle part fixed with respect to the casing and spaced from said movable throttle part, said cooling air directing means directing cooling air to the space between the fixed and movable throttle parts, operation of said throttle being automatically controlled solely by thermal expansion and contraction of said wall.

5. A combustion chamber comprising a casing, a flame tube mounted within said casing, opposite ends of the flame tube being respectively fixed and movable by thermal expansion of the tube with respect to said casing, a throttle having a movable part and a fixed part, the movable throttle part being connected to and arranged to move with the movable end of the flame tube and being spaced from the fixed throttle part which is fixed with respect to the casing, and means for supplying cooling air only to the space between the movable and fixed throttle parts, the fixed throttle part being mounted within the movable end of the flame tube and constructed to direct the cooling air onto the internal wall of the latter.

6. A combustion chamber comprising a casing, a flame tube mounted within said casing with an annular clearance therebetween, opposite ends of the flame tube being respectively fixed and movable with respect to said casing, means for directing cooling air through said clearance so as to cool the external wall of the flame tube, a throttle having a movable part and a fixed part, the movable throttle part being connected to move with the movable end of the flame tube upon thermal expansion of the tube and being spaced from the fixed throttle part which is fixed with respect to the casing, and means for supplying cooling air only to the space between the movable and fixed throttle parts, the fixed throttle part being mounted within the movable end of the flame tube and constructed to direct the cooling air onto the internal wall of the latter.

7. A combustion chamber as claimed in claim 6 in which the flame tube is provided at axially spaced points downstream from said throttle with annular openings through which cooling air from said annular clearance may enter the flame tube and cool the internal wall thereof, said openings being formed by overlapping inner and outer wall parts spaced by interposed annular strip members having axially extending corrugations for the inward flow of cooling air from said annular clearance.

8. A combustion chamber comprising a casing, a flame tube mounted within said casing with an annular clearance therebetween, a pin joint radially disposed with respect to the longitudinal axis of the chamber connecting one end only of the flame tube to the casing, a member fast with said casing and a sliding joint between said member and the opposite end of the flame tube, means for directing cooling air through said clearance so as to cool the external wall of the flame tube, a throttle having a movable part and a fixed part, the movable throttle part being connected to move with the said opposite end of the flame tube upon thermal expansion of the tube along its longitudinal axis and being spaced from a throttle part fixed with respect to the casing, and means for supplying cooling air to the space between the movable and fixed throttle parts, the fixed throttle part being mounted within the said opposite end of the flame tube and constructed to direct the cooling air onto the internal wall of the latter.

9. A gas turbine engine having a combustion chamber comprising a casing, a flame tube mounted within said casing witthin an annular clearance therebetween, a pin joint radially disposed with respect to the longitudinal axis of the chamber connecting one end of the flame tube to the casing, a member fast with said casing and a sliding joint between said member and the opposite end of the flame tube, means for directing cooling air through said clearance so as to cool the external wall of the flame tube, a throttle having a movable part and a fixed part, the movable throttle part forming a restriction to the said opposite end of the flame tube and having an opening, the wall of which is spaced from the fixed throttle part which is fixed with respect to the casing, and means for supplying cooling air to the space between the movable and fixed throttle parts, the fixed throttle part being mounted within the said opposite end of the flame tube and constructed to direct the cooling air onto the internal wall of the latter.

References Cited in the file of this patent

UNITED STATES PATENTS

| | | |
|---|---|---|
| 2,621,477 | Powter | Dec. 16, 1952 |
| 2,699,648 | Berkey | Jan. 18, 1955 |
| 2,837,893 | Schirmer | June 10, 1958 |
| 2,907,171 | Lysholm | Oct. 6, 1959 |
| 2,913,873 | Murray | Nov. 24, 1959 |

FOREIGN PATENTS

| | | |
|---|---|---|
| 697,027 | Great Britain | Sept. 16, 1953 |